United States Patent
Han et al.

(10) Patent No.: US 9,455,441 B2
(45) Date of Patent: Sep. 27, 2016

(54) POSITIVE ACTIVE MATERIAL COMPOSITION FOR RECHARGEABLE LITHIUM BATTERY, POSITIVE ELECTRODE PREPARED FROM COMPOSITION, AND RECHARGEABLE LITHIUM BATTERY INCLUDING POSITIVE ELECTRODE

(71) Applicant: Samsung SDI Co., Ltd., Yongin-si, Gyeonggi-Do (KR)

(72) Inventors: Seung-Hun Han, Yongin-si (KR); Myung-Duk Lim, Yongin-si (KR); Chae-Woong Cho, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 539 days.

(21) Appl. No.: 13/888,175

(22) Filed: May 6, 2013

(65) Prior Publication Data

US 2014/0193708 A1 Jul. 10, 2014

(30) Foreign Application Priority Data

Jan. 4, 2013 (KR) ........................ 10-2013-0001271

(51) Int. Cl.

| | | |
|---|---|---|
| *H01M 4/36* | (2006.01) | |
| *H01M 4/485* | (2010.01) | |
| *H01M 4/505* | (2010.01) | |
| *H01M 4/525* | (2010.01) | |
| *H01M 4/60* | (2006.01) | |
| *H01M 4/131* | (2010.01) | |
| *H01M 10/052* | (2010.01) | |
| *H01M 4/62* | (2006.01) | |
| *H01M 4/66* | (2006.01) | |

(52) U.S. Cl.
CPC ............. *H01M 4/366* (2013.01); *H01M 4/131* (2013.01); *H01M 4/485* (2013.01); *H01M 4/505* (2013.01); *H01M 4/525* (2013.01); *H01M 4/602* (2013.01); *H01M 10/052* (2013.01); *H01M 4/621* (2013.01); *H01M 4/622* (2013.01); *H01M 4/623* (2013.01); *H01M 4/624* (2013.01); *H01M 4/625* (2013.01); *H01M 4/626* (2013.01); *H01M 4/661* (2013.01); *Y02E 60/122* (2013.01)

(58) Field of Classification Search
CPC .... H01M 4/366; H01M 4/505; H01M 4/525; H01M 4/621; H01M 4/622; H01M 4/623; H01M 4/625; H01M 4/626; H01M 4/131; H01M 4/624; H01M 4/661; H01M 10/052; Y02E 60/122

See application file for complete search history.

(56) References Cited

U.S. PATENT DOCUMENTS

| | | | |
|---|---|---|---|
| 6,183,911 B1 * | 2/2001 | Kweon ................. | H01M 4/505 429/221 |
| 7,211,349 B2 | 5/2007 | Leising et al. | |
| 7,767,342 B2 | 8/2010 | Nakai et al. | |
| 2009/0075165 A1 * | 3/2009 | Park ................. | H01M 2/14 429/129 |
| 2011/0111290 A1 | 5/2011 | Uchida et al. | |

FOREIGN PATENT DOCUMENTS

| | | |
|---|---|---|
| JP | 07-272765 A | 10/1995 |
| JP | 9-293508 (A) | 11/1997 |
| JP | 2004-134384 A | 4/2004 |
| JP | 4114247 B2 | 4/2008 |
| JP | 2009-140787 A | 6/2009 |
| JP | 2010-021027 A | 1/2010 |
| JP | 2010-021075 A | 1/2010 |
| KR | 10-2006-0050755 A | 5/2006 |
| KR | 10-2009-0030087 (A) | 3/2009 |

OTHER PUBLICATIONS

Korean Office Action dated Jul. 18, 2016 for Korean Patent Application No. KR 10-2013-0001271, from which subject U.S. Appl. No. 13/888,175 claims priority.

* cited by examiner

*Primary Examiner* — Laura Weiner (74) *Attorney, Agent, or Firm* — Knobbe Martens Olson & Bear, LLP (57) ABSTRACT

In an aspect, a positive active material composition for a rechargeable lithium battery including a positive active material coated with a vanadium pentaoxide ($V_2O_5$) and an aqueous binder, a positive electrode including the same, and a rechargeable lithium battery including the positive electrode is disclosed.

11 Claims, 5 Drawing Sheets

POSITIVE ACTIVE MATERIAL COMPOSITION FOR RECHARGEABLE LITHIUM BATTERY, POSITIVE ELECTRODE PREPARED FROM COMPOSITION, AND RECHARGEABLE LITHIUM BATTERY INCLUDING POSITIVE ELECTRODE

INCORPORATION BY REFERENCE TO RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0001271 filed on Jan. 4, 2013 in the Korean Intellectual Property Office, the disclosure of which is incorporated in its entirety herein by reference.

BACKGROUND

1. Field

This disclosure relates to a positive active material composition for a rechargeable lithium battery, a positive electrode obtained therefrom, and a rechargeable lithium battery including the same are disclosed.

2. Description of the Related Technology

A rechargeable lithium battery includes positive and negative electrodes and an organic electrolyte solution or a polymer electrolyte positioned between the positive and negative electrodes. Herein, the positive and negative electrodes intercalate and deintercalate lithium ions and produce electrical energy through oxidation and reduction reactions.

As for a positive active material for a lithium rechargeable battery, an oxide that has a structure of intercalating and deintercalating lithium ions and includes lithium and a transition element, for example, a lithium cobalt oxide ($LiCoO_2$), a lithium nickel oxide ($LiNiO_2$), or a lithium nickel cobalt manganese oxide ($Li[NiCoMn]O_2$, $Li[Ni_{1-x-y}Co_xM_y]O_2$), and the like, have been investigated.

When the positive active material for a rechargeable lithium battery is used with an aqueous binder to fabricate a positive electrode, the positive active material provides unreacted alkali metal ions dissociated into water, which dramatically increases the pH of the positive active material slurry and makes the positive active material slurry strongly basic.

Accordingly, when such an aqueous positive active material slurry having strong basicity is coated on a metal current collector, the metal current collector may be corroded due to the high pH of the material and generate $H_2$ gas and thus, make numerous pinholes on the positive electrode and increase internal resistance of the positive electrode.

In order to solve this problem, Japanese Patent No. 4114247 (2008 Apr. 25) discloses a non-aqueous electrolyte rechargeable battery including a molybdenum trioxide ($MoO_3$) component in a positive electrode. However, the molybdenum trioxide ($MoO_3$) has low electrical conductivity and thus, may increase resistance of an electrode and deteriorate charge and discharge characteristics of the lithium rechargeable battery.

In addition, Japanese Patent Laid-Open Publication No. 2010-021027 (2010 Jan. 28) discloses a method of coating various metal oxides on an Al current collector. However, the method needs additional processing and thus, increases a cost due to the additional processing.

Accordingly, additional research on a novel aqueous positive active material composition to prevent corrosion of a metal current collector is needed.

SUMMARY

One embodiment provides a positive active material composition for a rechargeable lithium battery that prevents corrosion of a metal current collector and has high electrical conductivity.

Another embodiment provides a positive electrode for a rechargeable lithium battery that decreases resistance of an electrode and ensures excellent high rate capability and cycle-life characteristics.

Still another embodiment provides a rechargeable lithium battery including the same.

Some embodiments provide a method of preparing a positive active material that includes mixing a positive active material, a vanadium pentaoxide ($V_2O_5$), and an organic solvent, agitating the mixture to evaporate the organic solvent, and then, heating the resultant mixture to prepare a positive active material coated with the vanadium pentaoxide.

In some embodiments, the positive active material may include at least one selected from a lithium cobalt-based oxide, a lithium nickel cobalt manganese-based oxide, and a lithium nickel cobalt aluminum-based oxide. In some embodiments, the lithium cobalt-based oxide may be $Li_aA_{1-b}R_bD^1_2$ where A is Co and $D^1$ is O (oxygen) ($0.90 \leq a \leq 1.8$ and $0 \leq b \leq 0.5$). In some embodiments, the lithium nickel cobalt manganese-based oxide may be $Li_aNi_{1-b-c}Co_bR_cD^1_\alpha$ where R is Co and $D^1$ is O (oxygen) ($0.90 \leq a \leq 1.8$, $0 \leq b \leq 0.5$, $0 \leq c \leq 0.05$ and $0 \leq \alpha \leq 2$). In some embodiments, the $Li_aNi_{1-b-c}Co_bR_cD^1_\alpha$ may be $Li[Ni_{0.5}Co_{0.2}Mn_{0.3}]O_2$. In some embodiments, the lithium nickel cobalt aluminum-based oxide may be $Li_aNi_{1-b-c}Co_bR_cD^1_\alpha$ where R is Al and $D^1$ is O (oxygen) ($0.90 \leq a \leq 1.8$, $0 \leq b \leq 0.5$, $0 \leq c \leq 0.05$ and $0 \leq \alpha \leq 2$).

In some embodiments, the vanadium pentaoxide ($V_2O_5$) may be included in an amount of about 0.1 parts to about 5 parts by weight based on 100 parts by weight of the positive active material.

In some embodiments, the organic solvent may be a carbonate-based, alcohol-based, ester-based, ether-based, ketone-based, or aromatic hydrocarbon-based solvent, an aprotic solvent, or a combination thereof.

In some embodiments, the heating may be performed at about 620° C. to about 730° C.

Some embodiments provide a positive active material composition for a rechargeable lithium battery that includes the positive active material coated with the vanadium pentaoxide ($V_2O_5$) and an aqueous binder.

In some embodiments, the vanadium pentaoxide ($V_2O_5$) may be coated on the surface of the positive active material into an island shape.

In some embodiments, the vanadium pentaoxide ($V_2O_5$) may be included in an amount of about 0.1 parts to about 5 parts by weight based on 100 parts by weight of the positive active material.

In some embodiments, the vanadium pentaoxide ($V_2O_5$) may be included in an amount of about 0.1 parts to about 1 part by weight based on 100 parts by weight of the positive active material.

In some embodiments, the positive active material coated with the vanadium pentaoxide may be prepared according to the preparing method described above.

In some embodiments, the positive active material may include at least one selected from a lithium cobalt-based oxide, a lithium nickel cobalt manganese-based oxide, and a lithium nickel cobalt aluminum-based oxide. In some embodiments, the lithium cobalt-based oxide may be $Li_aA_{1-b}R_bD^1_2$ where A is Co and $D^1$ is O (oxygen) ($0.90 \le a \le 1.8$ and $0 \le b \le 0.5$). In some embodiments, the lithium nickel cobalt manganese-based oxide may be $Li_aNi_{1-b-c}Co_bR_cD^1_\alpha$ where R is Mn and $D^1$ is O (oxygen) ($0.90 \le a \le 1.8$, $0 \le b \le 0.5$, $0 \le c \le 0.05$ and $0 \le \alpha \le 2$). In some embodiments, the $Li_aNi_{1-b-c}Co_bR_cD^1_\alpha$ may be $Li[Ni_{0.5}Co_{0.2}Mn_{0.3}]O_2$. In some embodiments, the lithium nickel cobalt aluminum-based oxide may be $Li_aNi_{1-b-c}Co_bR_cD^1_\alpha$ where R is Al and $D^1$ is O (oxygen) ($0.90 \le a \le 1.8$, $0 \le b \le 0.5$, $0 \le c \le 0.05$ and $0 \le \alpha \le 2$).

In some embodiments, the aqueous binder may include at least one selected from carboxylmethylcellulose, hydroxyethylcellulose, hydroxypropylcellulose, hydroxypropylmethylcellulose, polyvinylidene fluoride, polytetrafluoroethylene, polyethylene, polypropylene, polybutadiene, polyethyleneoxide, polyvinylalcohol, polyacrylic acid and a salt thereof, polyvinylpyrrolidone, polyepichlorohydrine, polyphosphazene, polyacrylonitrile, polystyrene, polyvinylpyridine, chlorosulfonated polyethylene, a polyester resin, an acrylic resin, a phenolic resin, an epoxy resin, a polymer of propylene and C2 to C8 olefin, a copolymer of (meth)acrylic acid and (meth)acrylic acid alkylester, acryl-based copolymer emulsion, and a combination thereof.

In some embodiments, the aqueous binder may be included in an amount of about 0.1 parts to about 10 parts by weight based on 100 parts by weight of the positive active material.

In some embodiments, the positive active material composition for a rechargeable lithium battery may further include a conductive material.

In some embodiments, the conductive material may include at least one selected from natural graphite, artificial graphite, carbon black, acetylene black, ketjen black, a carbon fiber, carbon nanotube, a metal powder, a metal fiber, and a conductive polymer.

Some embodiments provide a positive electrode for a rechargeable lithium battery that includes a metal current collector having corrodibility in strong alkali media; and the positive active material layer disposed by using the positive active material composition on at least one surface of the metal substrate.

In some embodiments, the metal current collector may be an aluminum substrate.

Some embodiments provide a rechargeable lithium battery including the positive electrode; a negative electrode including a negative active material; a separator interposed between the positive and negative electrodes; and an electrolyte.

In some embodiments, the positive active material composition prevents corrosion of the metal current collector in a rechargeable lithium battery and simultaneously has high electrical conductivity. In some embodiments, the positive active material composition decreases resistance of the electrode and ensures excellent high rate capability and cycle-life characteristic of the rechargeable lithium battery.

DETAILED DESCRIPTION

Exemplary embodiments of the present disclosure will hereinafter be described in detail. However, these embodiments are only exemplary, and this disclosure is not limited thereto.

Some embodiments provide a positive active material composition for a rechargeable lithium battery including a positive active material coated with vanadium pentaoxide ($V_2O_5$) and an aqueous binder.

In some embodiments, the vanadium pentaoxide ($V_2O_5$) may be coated on the surface of the positive active material into an island shape.

In some embodiments, the positive active material composition may be an aqueous positive active material composition capable of using water as a solvent.

Typically, a positive electrode for a rechargeable lithium battery includes an aluminum substrate playing a role of a current collector and a thin aluminum oxide ($Al_2O_3$) film on the surface thereof. This aluminum oxide film may hinder reaction between an aluminum metal and water in a neutral aqueous solution and suppress generation of hydrogen gas according to the following Reaction Scheme 1.

$2Al + 3H_2O \rightarrow Al_2O_3 + 3H_2 \uparrow$ (Reaction Scheme 1)

However, aluminum oxide ($Al_2O_3$) reacts according to the following Reaction Scheme 2 in an alkali aqueous solution and provides an aluminate ion ($AlO_2^-$) into the solution and thus, exposes aluminum metal on the surface of the current collector allowing another reaction according to the following Reaction Scheme 3. Herein, the reaction generates hydrogen gas, which forms a pin hole on the surface of an electrode.

$Al_2O_3 + H_2O + 2OH^- \rightarrow 2AlO_2^- + 2H_2O$ (Reaction Scheme 2)

$2Al + 6OH^- + 6H_2O \rightarrow 2[Al(OH)_6]^{3-} + 3H_2 \uparrow$ (Reaction Scheme 3)

In contrast, a positive active material coated with a vanadium pentaoxide ($V_2O_5$) may suppress the reaction according to the Reaction Scheme 3 under basic conditions but cause formation of an aluminum oxide film according to the following Reaction Scheme 4, since the vanadium pentaoxide ($V_2O_5$) is a strong oxidant.

$2Al + 3V_2O_5 \rightarrow Al_2O_3 + 3V_2O_4$ (Reaction Scheme 4)

In some embodiments, the vanadium pentaoxide ($V_2O_5$) prevents corrosion of aluminum, suppresses formation of pin holes on an electrode and thus, may suppress increase of electrode resistance.

In addition, the vanadium pentaoxide ($V_2O_5$) has low electrical resistivity of about 197 nΩm and provides the positive active material with high electrical conductivity and thus, may decrease resistance of the electrode and secure excellent high rate capability and cycle-life characteristics of a rechargeable lithium battery.

In some embodiments, the positive active material coated with the vanadium pentaoxide may be prepared by mixing a positive active material, vanadium pentaoxide ($V_2O_5$) and an organic solvent, removing the organic solvent and heating the resultant mixture after removal of the organic solvent. In some embodiments, the removal of the organic solvent may be accomplished by agitation of the mixture to evaporate the organic solvent.

In some embodiments, the organic solvent may be highly volatile. Examples of the organic solvent may include a carbonate-based, alcohol-based, ester-based, ether-based, ketone-based, or aromatic hydrocarbon-based solvent, an aprotic solvent, or a combination thereof.

In some embodiments, the organic solvent may include methanol, ethanol, n-propanol, isopropanol, n-butanol, t-butylalcohol, ethylene glycol dimethacrylate, methylethylketone (butanone), methylisobutylketone, benzene, toluene, ethylene carbonate, dimethyl carbonate, ethylmethyl carbonate, N-methylpyrrolidone, or a combination thereof, but is not limited thereto.

In some embodiments, the agitation of the mixture to evaporate the organic solvent may be performed at about 30° C. to about 90° C. and specifically, about 30° C. to about 70° C. or about 30° C. to about 50° C.

In some embodiments, the resultant mixture after evaporating the organic solvent may be heated in the range of from about 620° C. to about 730° C. When the heating is performed within the temperature range of from about 620° C. to about 730° C., the vanadium pentaoxide ($V_2O_5$) may not be decomposed but appropriately attached to the surface of the positive active material in an island shape. Since vanadium pentaoxide ($V_2O_5$) has a melting point ranging from about 650° C. to about 700° C., the vanadium pentaoxide ($V_2O_5$) may not bond with the positive active material but be detached therefrom when the calcinating is performed at a temperature of less than about 620° C. On the contrary, when the calcinating is performed at a temperature of higher than about 730° C., the vanadium pentaoxide ($V_2O_5$) is doped inside the positive active material and may have no effect on suppressing corrosion of the current collector.

The amount of the vanadium pentaoxide ($V_2O_5$) is included in the positive active material with no particular limit. However, when vanadium pentaoxide ($V_2O_5$) is included in an excessively small amount, corrosion of an aluminum current collector may not be effectively prevented, while when vanadium pentaoxide ($V_2O_5$) is included in an excessively large amount, the positive active material may be included in a relatively small amount in an electrode, decreasing capacity. In addition, when the vanadium pentaoxide ($V_2O_5$) is included in greater quantity than the active material, the active material may deteriorate density per unit capacity all over the electrode.

In some embodiments, the vanadium pentaoxide ($V_2O_5$) may be included in an amount of about 0.1 parts to about 5 parts by weight, specifically about 0.1 parts to about 4 parts by weight, about 0.1 parts to about 3 parts by weight, about 0.1 parts to about 2 parts by weight, about 0.1 parts to about 1 parts by weight based on 100 parts by weight of the positive active material.

In some embodiments, the positive active material may be any positive active material in this art, unless the positive active material is weak for an aqueous binder and an aqueous solvent and elutes a metal ion.

For example, a lithiated intercalation compound that may reversibly intercalate and deintercalate lithium ions may be used. Examples thereof may be a composite oxide of lithium and a metal selected from cobalt, manganese, nickel, and a combination thereof. Examples of the positive active material are compounds represented by the following chemical formulae:

$Li_aA_{1-b}R_bD^1_2$ (0.90≤a≤1.8 and 0≤b≤0.5);

$Li_aE_{1-b}R_bO_{2-c}D^1_c$ (0.90≤a≤1.8, 0≤b≤0.5 and 0≤c≤0.05);

$LiE_{2-b}R_bO_{4-c}D^1_c$ (0≤b≤0.5, 0≤c≤0.05);

$Li_aNi_{1-b-c}Co_bR_cD^1_\alpha$ (0.90≤a≤1.8, 0≤b≤0.5, 0≤c≤0.05 and 0≤α≤2);

$Li_aNi_{1-b-c}Co_bR_cO_{2-\alpha}Z_\alpha$ (0.90≤a≤1.8, 0≤b≤0.5, 0≤c≤0.05 and 0≤α≤2);

$Li_aNi_{1-b-c}Co_bR_cO_{2-\alpha}Z_2$ (0.90≤a≤1.8, 0≤b≤0.5, 0≤c≤0.05 and 0≤α≤2);

$Li_aNi_{1-b-c}Mn_bR_cD^1_\alpha$ (0.90≤a≤1.8, 0≤b≤0.5, 0≤c≤0.05 and 0≤α≤2);

$Li_aNi_{1-b-c}Mn_bR_cO_{2-\alpha}Z_\alpha$ (0.90≤a≤1.8, 0≤b≤0.5, 0≤c≤0.05 and 0≤α≤2);

$Li_aNi_{1-b-c}Mn_bR_cO_{2-\alpha}Z_2$ (0.90≤a≤1.8, 0≤b≤0.5, 0≤c≤0.05 and 0≤α≤2);

$Li_aNi_bE_cG_dO_2$ (0.90≤a≤1.8, 0≤b≤0.9, 0≤c≤0.5 and 0.001≤d≤0.1.);

$Li_aNi_bCo_cMn_dGeO_2$ (0.90≤a≤1.8, 0≤b≤0.9, 0≤c≤0.5, 0≤d≤0.5 and 0.001≤e≤0.1.);

$Li_aNiG_bO_2$ (0.90≤a≤1.8 and 0.001≤b≤0.1.);

$Li_aCoG_bO_2$ (0.90≤a≤1.8 and 0.001≤b≤0.1.);

$Li_aMnG_bO_2$ (0.90≤a≤1.8 and 0.001≤b≤0.1.);

$Li_aMn_2G_bO_4$ (0.90≤a≤1.8 and 0.001≤b≤0.1.);

$QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A may be Ni, Co, Mn, or a combination thereof; R may be Al, Ni, Co, Mn, Cr, Fe, Mg, Sr, V, a rare earth element, or a combination thereof; $D^1$ may be O (oxygen), F (fluorine), S (sulfur), P (phosphorus), or a combination thereof; E may be Co, Mn, or a combination thereof; Z is F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; and J may be V, Cr, Mn, Co, Ni, Cu, or a combination thereof.

In some embodiments, the positive active material composition has an aqueous system and thus, includes an aqueous binder using water as a solvent. The aqueous binder plays a role of thoroughly attaching positive active material particles to one another and the positive active material particles to the current collector and also works as a thickener of increasing viscosity of the positive active material composition.

The aqueous binder is compatible with moisture and does not need to be handled under anhydrous conditions unlike a non-aqueous binder like NMP (N-methylpyrrolidone). The aqueous binder needs no recycling process and thus, is environmentally-friendly and also, decreases manufacturing equipment. In addition, the aqueous binder has a binding mechanism having no much influence on the specific surface area of materials used in the electrode and may be applied to various materials having a large specific surface area and also, has the low heat generation due to the low reactivity with an electrolyte and thus, excellent stability.

Examples of the aqueous binder may include carboxylmethylcellulose, hydroxyethylcellulose, hydroxypropylcellulose, hydroxypropylmethylcellulose, polyvinylidene fluoride, polytetrafluoroethylene, polyethylene, polypropylene, polybutadiene, polyethyleneoxide, polyvinylalcohol, polyacrylic acid and a salt thereof, polyvinylpyrrolidone, polyepichlorohydrine, polyphosphazene, polyacrylonitrile, polystyrene, polyvinylpyridine, chlorosulfonated polyethylene, a polyester a resin, an acrylic resin, a phenolic resin, an epoxy resin, a polymer of propylene and C2 to C8 olefin, a copolymer of (meth)acrylic acid and (meth)acrylic acid alkylester, and the like, but are not limited thereto. Any aqueous binder in this art may be used.

In some embodiments, the binder may be used singularly or as a mixture of two or more binders.

In some embodiments, the aqueous binder may be used in an appropriate amount enough to apply a binding force among positive active material particles and between the positive active material particles and a current collector and viscosity of the positive active material composition without a particular limit. For example, the aqueous binder may be used in an amount of about 0.1 parts to about 10 parts by weight, specifically, about 1 parts to about 8 parts by weight, and more specifically, about 4 parts to about 8 parts by weight based on 100 parts by weight of the positive active material.

In some embodiments, the positive active material composition for a rechargeable lithium battery may further include a conductive material. The conductive material improves electrical conductivity of the negative electrode. Any electrically conductive material may be used, unless it causes a chemical change.

Examples of the conductive material may include at least one selected from natural graphite, artificial graphite, carbon black, acetylene black, ketjen black, a carbon fiber, a metal powder or a metal fiber including copper, nickel, aluminum, silver, and the like, and the like, or a polyphenylene derivative and the like.

In some embodiments, the conductive material may be included in an amount of about 1 part to about 20 parts by weight based on 100 parts by weight of the positive active material.

Some embodiments provide a positive electrode for a rechargeable lithium battery that includes a metal current collector having corrodibility for strong alkali; and a positive active material layer disposed on at least one surface of the metal current collector. In some embodiments, the positive active material layer may be formed by using the positive active material composition.

In the positive electrode, the metal current collector includes any material, unless it causes chemical changes but has high conductivity. For example, the metal current collector may be stainless steel, aluminum, nickel, titanium, fired carbon, or aluminum, or stainless steel that is surface-treated with carbon, nickel, titanium, silver, and the like. The metal current collector having corrodibility for strong alkali may include, for example, an aluminum substrate. In some embodiments, the aluminum substrate may be effectively prevented from corrosion by applying the positive active material composition thereon. In some embodiments, the metal current collector may have a thickness ranging from 3 μm to 500 μm but is not limited thereto.

In some embodiments, the positive electrode may be fabricated by molding the positive active material composition into a predetermined shape or coating the positive active material composition on the metal current collector such as an aluminum foil and the like.

In some embodiments, the positive active material composition may be directly coated and dried on the metal current collector to form a positive active material layer. In some embodiments, a positive active material layer may be formed by casting the slurry composition on a separate supporter and peeling off a formed film from the supporter and then, laminating the film on the metal substrate. In some embodiments, the positive electrode may be fabricated in various ways other than the aforementioned methods to an ordinary skilled person in a related field.

Some embodiments provide a rechargeable lithium battery including the positive electrode; a negative electrode including a negative active material; a separator interposed between the positive and negative electrodes; and an electrolyte is provided.

Figure 1:
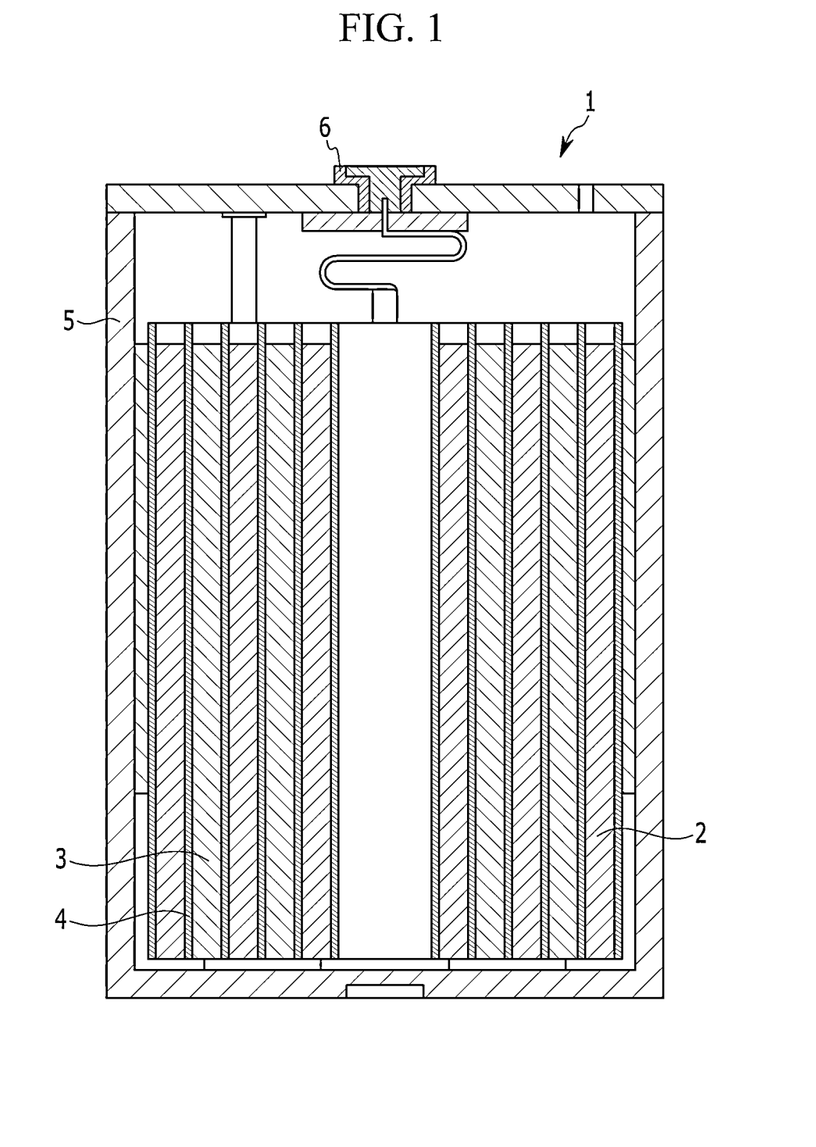
FIG. 1 is a schematic view showing a rechargeable lithium battery according to one embodiment.

FIG. 1 is a schematic view showing the representative structure of a rechargeable lithium battery according to one embodiment. As shown in FIG. 1, the rechargeable lithium battery 1 includes a positive electrode 3, a negative electrode 2, and a separator interposed between the positive electrode 3 and the negative electrode 2, an electrolyte impregnated therein, a battery case 5 including the foregoing elements, and a sealing member sealing the battery case 5.

In some embodiments, the negative electrode of the rechargeable lithium battery includes a current collector and a negative active material layer formed on the current collector, and the negative active material layer includes a negative active material.

In some embodiments, the negative active material may include a material that reversibly intercalates/deintercalates lithium ions, a lithium metal, a lithium metal alloy, a material being capable of doping/dedoping lithium, or a transition metal oxide.

In some embodiments, the material that reversibly intercalates/deintercalates lithium ions may be a carbon material. In some embodiments, the carbon material may be any generally-used carbon-based negative active material used in a lithium ion rechargeable battery. Examples of the carbon-based negative active material may include crystalline carbon, amorphous carbon, or a combination thereof. In some embodiments, the crystalline carbon may be non-shaped, or sheet, flake, spherical, or fiber-shaped natural graphite or artificial graphite. In some embodiments, the amorphous carbon may be a soft carbon, a hard carbon, a mesophase pitch carbonized product, fired coke, and the like.

In some embodiments, the lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

In some embodiments, the material being capable of doping/dedoping lithium may include Si, $SiO_x$ (0<x<2), a Si—C composite, a Si-Q alloy (wherein Q is an alkali metal, an alkaline-earth metal, Group 13 to 16 elements, a transition element, a rare earth element, or a combination thereof, and not Si), Sn, $SnO_2$, a Sn—C composite, a Sn—R alloy (wherein R is an alkali metal, an alkaline-earth metal, Group 13 to 16 elements, a transition element, a rare earth element, or a combination thereof, and not Sn), and the like. In some embodiments, the elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. In some embodiments, the elements Q and R may be Mg, Ca, Sr, Ba, Sc, Y, Ti, Zr, Hf, V, Nb, Ta, Cr, Mo, W, Re, Fe, Pb, Ru, Os, Rh, Ir, Pd, Pt, Cu, Ag, Au, Zn, Cd, B, Al, Ga, Sn, In, Tl, Ge, P, As, Sb, Bi, S, Se, Te, or a combination thereof.

In some embodiments, the transition metal oxide may include a vanadium oxide, a lithium vanadium oxide, and the like.

In some embodiments, the negative active material layer includes a binder and optionally, a conductive material.

The binder improves binding properties of the negative active material particles to one another and to a current collector. The binder includes a non-water-soluble binder, a water-soluble binder, or a combination thereof. The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof. When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material.

The conductive material improves electrical conductivity of the negative electrode. Any electrically conductive material can be used as a conductive agent unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene; or a mixture thereof.

In some embodiments, the current collector may be a copper foil, a nickel foil, a stainless steel foil, a titanium foil, a nickel foam, a copper foam, a polymer substrate coated with a conductive metal, or a combination thereof.

In some embodiments, the negative electrode may be manufactured in a method of preparing a negative active material composition by mixing the negative active material, a conductive material, and a binder and coating the composition on a current collector. The electrode manufacturing method is well known and thus, is not described in detail in the present specification. In some embodiments, the solvent includes N-methylpyrrolidone, water and the like but is not limited thereto.

The separator may include any materials commonly used in the conventional lithium battery, as long as separating a negative electrode from a positive electrode and providing a transporting passage for lithium ions. In other words, the separator may be made of a material having low resistance to ion transportation and excellent impregnation for an electrolyte. For example, the material may be selected from glass fiber, polyester, polyethylene, polypropylene, polytetrafluoroethylene (PTFE), or a combination thereof and have a form of a non-woven fabric or a woven fabric. For example, a polyolefin-based polymer separator such as polyethylene, polypropylene or the like is mainly used for a lithium ion battery. In order to ensure heat resistance or mechanical strength, a coated separator including a ceramic component or a polymer material may be used and selectively, have a mono-layered or multi-layered structure.

In some embodiments, the electrolyte includes a non-aqueous organic solvent and a lithium salt.

The non-aqueous organic solvent serves as a medium for transmitting ions taking part in the electrochemical reaction of a battery.

In some embodiments, the non-aqueous organic solvent may be selected from a carbonate-based, ester-based, ether-based, ketone-based, alcohol-based, or aprotic solvent. The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methylpropinonate, ethylpropinonate, γ-butyrolactone, decanolide, valerolactone, mevalonolactone, caprolactone, and the like. In some embodiments, the ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like. In some embodiments, the alcohol-based solvent may include ethanol, isopropylalcohol, and the like. In some embodiments, the aprotic solvent include nitriles such as R—CN (wherein R is a C2 to C20 linear, branched, or cyclic hydrocarbon group, and may include one or more double bonds, one or more aromatic rings, or one or more ether bonds), amides such as dimethylformamide, dimethylacetamide, dioxolanes such as 1,3-dioxolane, sulfolanes, and the like.

In some embodiments, the non-aqueous organic solvent may be used singularly or in a mixture. When the organic solvent is used in a mixture, the mixture ratio may have a ratio controlled in accordance with desirable performance of a battery.

In some embodiments, the carbonate-based solvent may include a mixture of a cyclic carbonate and a linear carbonate. The cyclic carbonate and the linear carbonate are mixed together in a volume ratio of about 1:1 to about 1:9 as an electrolyte, and the electrolyte may have enhanced performance.

In some embodiments, the non-aqueous organic solvent may be prepared by further adding the aromatic hydrocarbon-based solvent to the carbonate-based solvent. The carbonate-based solvent and the aromatic hydrocarbon-based solvent are mixed together in a volume ratio of about 1:1 to about 30:1.

In some embodiments, the aromatic hydrocarbon-based organic solvent may be an aromatic hydrocarbon-based compound represented by the following Chemical Formula 1.

Chemical Formula 1 wherein in Chemical Formula 1, $R_1$ to $R_6$ are independently hydrogen, a halogen, a C1 to C10 alkyl group, a C1 to C10 haloalkyl group, or a combination thereof.

In some embodiments, the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

In some embodiments, the non-aqueous electrolyte may further include vinylene carbonate or an ethylene carbonate-based compound represented by the following Chemical Formula 2 in order to improve cycle-life of a battery.

Chemical Formula 2 wherein in Chemical Formula 2, $R_7$ and $R_8$ are independently hydrogen, a halogen, a cyano group (CN), a nitro group ($NO_2$), or a C1 to C5 fluoroalkyl group, provided that at least one of $R_7$ and $R_8$ is halogen, a cyano group (CN), a nitro group ($NO_2$), or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate or fluoroethylene carbonate, and the like. In some embodiments, the use amount of the vinylene carbonate or the ethylene carbonate-based compound may be adjusted within an appropriate range.

The lithium salt is dissolved in the non-aqueous solvent, supplies lithium ions in a rechargeable lithium battery, and basically operates the rechargeable lithium battery and thus, improves lithium ion transfer between the positive and negative electrodes. In some embodiments, the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers of 1 to 20, respectively), LiCl, LiI, $LiB(C_2O_4)_2$ (lithium bis(oxalato) borate), and a combination thereof. In some embodiments, the lithium salt may be used in a concentration of about 0.1 to about 2.0M. When the lithium salt is included within the above concentration range, an electrolyte may have excellent performance and lithium ion mobility due to optimal electrolyte conductivity and viscosity.

Hereinafter, the following examples illustrate the present invention in more detail. These examples, however, should not in any sense be interpreted as limiting the scope of the present invention.

EXAMPLES

Fabrication of Positive Electrode

Preparation Example 1

10 g of a $V_2O_5$ solution (concentration: 10 wt %, solvent: water), 200 g of $Li[Ni_{0.5}Co_{0.2}Mn_{0.3}]O_2$, and 12 g of ethanol were mixed, and the mixture was agitated at 40° C. to evaporate ethanol. The resulting product was heated at a rate of 1° C./min until the temperature reached to 650° C., heated for 2 hours at this temperature, i.e., 650° C. while the temperature was maintained, and cooled down to 300° C. for 5 hours to coat the $Li[Ni_{0.5}Co_{0.2}Mn_{0.3}]O_2$ with the $V_2O_5$, thereby preparing a positive active material. In the resulting positive active material, $V_2O_5$ was coated on the surface of the positive active material into an island shape.

100 g of the $Li[Ni_{0.5}CO_{0.2}Mn_{0.3}]O_2$ coated with the $V_2O_5$ were mixed with 13.4 g of acetylene black and 3.3 g of carboxylmethyl cellulose in 75 g of water. Subsequently, 70 g of water and 25 g (40 wt %) of an acryl-based copolymer emulsion (AX-4069, Japan, Xeon Inc.) were additionally added thereto, and the resulting mixture was mixed, preparing a positive active material composition. The positive active material composition was coated on an aluminum foil and dried at 100° C. for 10 minutes, fabricating a positive electrode.

Preparation Example 2

A positive electrode was fabricated according to the same method as Preparation Example 1 except for using 5 g (10 wt %) of a $V_2O_5$ solution.

Preparation Example 3

A positive electrode was fabricated according to the same method as Preparation Example 1 except for using 15 g (10 wt %) of a $V_2O_5$ solution.

Comparative Preparation Example 1

A positive electrode was fabricated according to the same method as Preparation Example 1 except for using $Li[Ni_{0.5}Co_{0.2}Mn_{0.3}]O_2$ that was not coated with $V_2O_5$.

Fabrication of Rechargeable Lithium Battery Cell (Coin Cell)

Example 1

A coin cell (a CR2032 type) having a diameter of 20 mm was fabricated using the positive electrode according to Preparation Example 1 and a negative electrode. The negative electrode was fabricated by mixing 97.5 g of graphite, 1 g of carboxylmethyl cellulose (CMC), and 50 g of water and then adding 1.5 g of BM400B as a binder (styrene-butadiene rubber, 40% of a solid content, solvent:water) and 50 g of water thereto to prepare a slurry. The slurry was coated on a copper film followed by drying. A polyethylene/polypropylene separator, and an electrolyte were used to complete fabrication of the coin cell. The electrolyte was prepared by mixing ethylene carbonate (EC):diethyl carbonate (DEC):dimethyl carbonate (DMC) 1:1:8 volume ratio and dissolving 1.3 M $LiPF_6$ therein.

Examples 2 and 3

Coin cells were fabricated in the same method as Example 1 by respectively using the positive electrode according to Preparation Examples 2 and 3.

Comparative Example 1

A coin cell was fabricated in the same method as Example 1 except for using the positive electrode according to Comparative Preparation Example 1.

Evaluation Example 1

Evaluation of X-Ray Diffraction (XRD)

Figure 2:
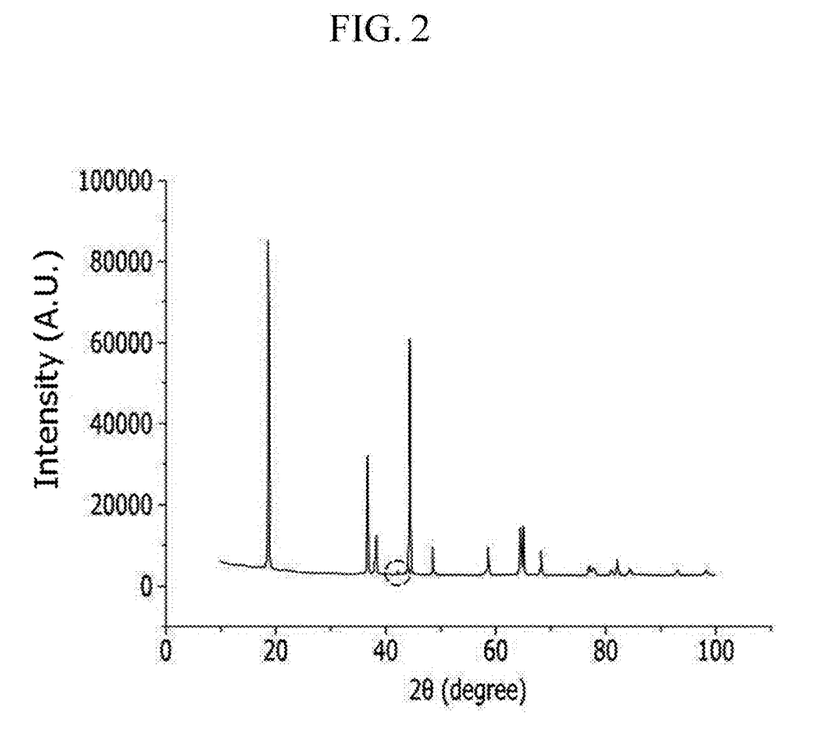
FIG. 2 shows the X-ray diffraction (XRD) pattern of a positive active material according to Preparation Example 1.
Figure 3:
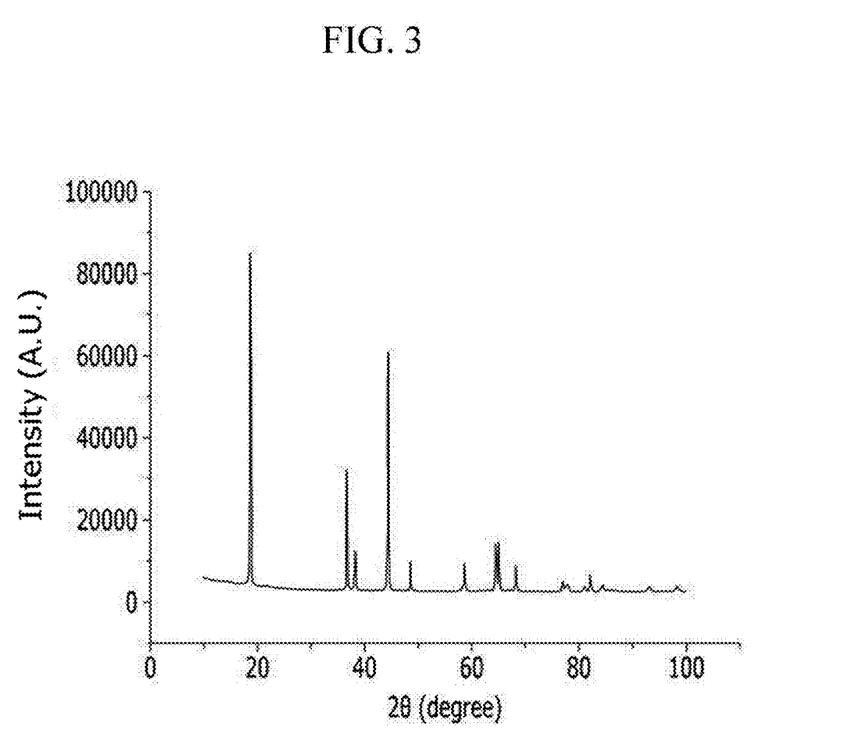
FIG. 3 shows the X-ray diffraction (XRD) pattern of a positive active material according to Comparative Preparation Example 1.

FIG. 2 shows the X-ray diffraction pattern of the positive active material according to Preparation Example 1, which includes $Li[Ni_{0.5}CO_{0.2}Mn_{0.3}]O_2$ coated with $V_2O_5$. In addition, FIG. 3 shows the X-ray diffraction pattern of the positive active material according to Comparative Preparation Example 1, which is $Li[Ni_{0.5}CO_{0.2}Mn_{0.3}]O_2$ that is not coated with $V_2O_5$.

In FIG. 2, a part marked with a circle is a peak showing vanadium (V). Referring to FIGS. 2 and 3, the positive active material according to Preparation Example 1 includes a peak corresponding to vanadium and the positive active material according to Comparative Preparation Example 1 does not include a peak corresponding to vanadium.

Evaluation Example 2

Pin Holes on Surface of Positive Electrode

The positive electrode according to Preparation Examples 1 to 3 and Comparative Preparation Example 1 were examined to have pin holes on the surface generated by hydrogen gas. The result is provided in the following Table 1.

Figure 4:
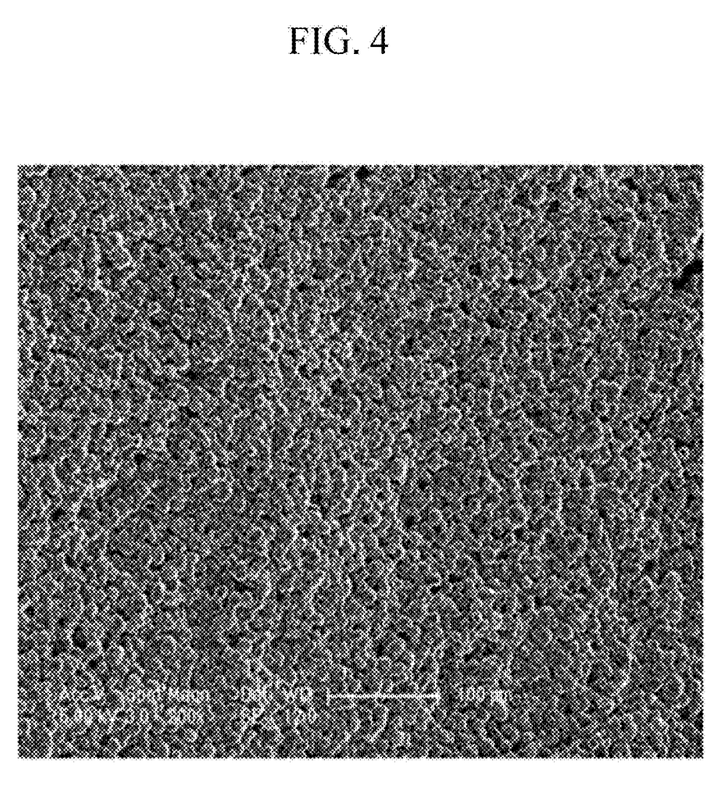
FIG. 4 is a scanning electron microscope showing the surface of the positive electrode according to one embodiment.
Figure 5:
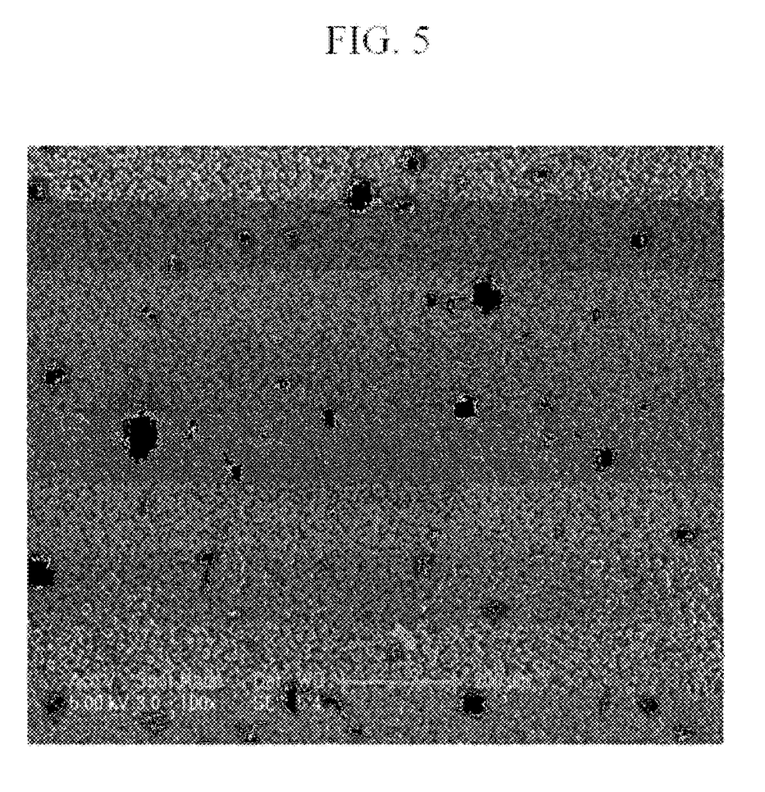
FIG. 5 is a scanning electron microscope showing the surface of the positive electrode according to Comparative Example.

In addition, FIG. 4 shows the scanning electron microscope (SEM) of the positive electrode according to Preparation Example 1, and FIG. 5 shows the scanning electron microscope (SEM) of the positive electrode according to Comparative Preparation Example 1.

TABLE 1

|  | $H_2$ pin holes |
|---|---|
| Preparation Example 1 | Not observed |
| Preparation Example 2 | Not observed |
| Preparation Example 3 | Not observed |
| Comparative Preparation Example 1 | Yes |

As shown in Table 1, the positive electrode according to Comparative Preparation Example 1 had pin holes, while the positive electrode according to Preparation Examples 1 to 3 had no pin holes.

Referring to FIG. 5, the positive electrode according to Comparative Preparation Example 1 shows pin holes. On the other hand, the positive electrode according to Example 1 did not have pin holes as shown in FIG. 4.

Evaluation Example 3

Cycle-Life Characteristics

The rechargeable lithium battery cells according to Examples 1 to 3 and Comparative Example 1 were charged at 0.8 C and discharged at 1.0 C within 3V to 4.2V for 100 times. The capacity retention (%) was obtained the ratio of the capacity of the 100th cycles relative to the capacity of the first cycle. The results are provided in the following Table 2.

TABLE 2

|  | Capacity retention (%) |
|---|---|
| Example 1 | 91.2 |
| Example 2 | 87.9 |
| Example 3 | 86.3 |
| Comparative Example 1 | 73.7 |

Referring to Table 2, the rechargeable lithium battery cells of Examples 1 to 3 had a capacity retention ranging from 86.3 to 91.2% and thus, excellent cycle-life characteristic compared with the rechargeable lithium battery cells of Comparative Example 1.

In the present disclosure, the terms "Example," "Comparative Example," "Evaluation Example" and "Preparation Example" are used arbitrarily to simply identify a particular example or experimentation and should not be interpreted as admission of prior art. While the embodiments have been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting the present invention in any way.

What is claimed is:

1. A positive active material composition for a rechargeable lithium battery, comprising,
a positive active material coated with vanadium pentaoxide ($V_2O_5$), wherein the positive active material comprises a lithium nickel cobalt manganese-based oxide; and
an aqueous binder, wherein the lithium nickel cobalt manganese-based oxide is $Li[Ni_{0.5}Co_{0.2}Mn_{0.3}]O_2$.

2. A positive electrode for a rechargeable lithium battery, comprising
a metal current collector; and
a positive active material layer formed on the metal current collector by using the positive active material composition of claim 1.

3. The positive electrode for a rechargeable lithium battery of claim 2, wherein the metal current collector is aluminum.

4. A rechargeable lithium battery, comprising
the positive electrode according to claim 2;
a negative electrode including a negative active material;
a separator interposed between the positive electrode and negative electrode; and
an electrolyte.

5. The positive active material composition of claim 1, wherein the vanadium pentaoxide ($V_2O_5$) is coated on a surface of the positive active material in a form of an island.

6. The positive active material composition of claim 1, wherein the vanadium pentaoxide ($V_2O_5$) is included in an amount of about 0.1 parts to about 5 parts by weight based on 100 parts by weight of the positive active material.

7. The positive active material composition of claim 1, wherein the vanadium pentaoxide ($V_2O_5$) is included in an amount of about 0.1 parts to about 1 parts by weight based on 100 parts by weight of the positive active material.

8. The positive active material composition of claim 1, wherein the aqueous binder comprises at least one selected from carboxylmethylcellulose, hydroxyethylcellulose, hydroxypropylcellulose, hydroxypropylmethylcellulose, polyvinylidene fluoride, polytetrafluoroethylene, polyethylene, polypropylene, polybutadiene, polyethyleneoxide, polyvinylalcohol, polyacrylic acid and a salt thereof, polyvinylpyrrolidone, polyepichlorohydrine, polyphosphazene, polyacrylonitrile, polystyrene, polyvinylpyridine, chlorosulfonated polyethylene, a polyester a resin, an acrylic resin, a phenolic resin, an epoxy resin, a polymer of propylene and C2 to C8 olefin, a copolymer of (meth)acrylic acid and (meth)acrylic acid alkylester, and a combination thereof.

9. The positive active material composition of claim 1, wherein the aqueous binder is included in an amount of about 0.1 parts to about 10 parts by weight based on 100 parts by weight of the positive active material.

10. The positive active material composition of claim 1, wherein the positive active material composition further comprises a conductive material.

11. The positive active material composition of claim 10, wherein the conductive material comprises at least one selected from natural graphite, artificial graphite, carbon black, acetylene black, ketjen black, a carbon fiber, a carbon nanotube, a metal powder, a metal fiber, and a conductive polymer.

* * * * *

UNITED STATES PATENT AND TRADEMARK OFFICE
CERTIFICATE OF CORRECTION

PATENT NO. : 9,455,441 B2
APPLICATION NO. : 13/888175
DATED : September 27, 2016
INVENTOR(S) : Seung-Hun Han et al.

It is certified that error appears in the above-identified patent and that said Letters Patent is hereby corrected as shown below:

In the Specification

In Column 2 at Line 32, Change "$0 \leq \alpha \leq 2$)." to --$0 < \alpha \leq 2$).--.

In Column 2 at Line 37, Change "$0 \leq \alpha \leq 2$)." to --$0 < \alpha \leq 2$).--.

In Column 3 at Line 8 (approx.), Change "$0 \leq \alpha \leq 2$)." to --$0 < \alpha \leq 2$).--.

In Column 3 at Line 12 (approx.), Change "$0 \leq \alpha \leq 2$)." to --$0 < \alpha \leq 2$).--.

In Column 6 at Line 8 (approx.), Change "$0 \leq \alpha \leq 2$);" to --$0 < \alpha \leq 2$);--.

In Column 6 at Line 11 (approx.), Change "$0 \leq \alpha \leq 2$);" to --$0 < \alpha \leq 2$);--.

In Column 6 at Line 13 (approx.), Change "$0 \leq \alpha \leq 2$);" to --$0 < \alpha \leq 2$);--.

In Column 6 at Line 16 (approx.), Change "$0 \leq \alpha \leq 2$);" to --$0 < \alpha \leq 2$);--.

In Column 6 at Line 19 (approx.), Change "$0 \leq \alpha \leq 2$);" to --$0 < \alpha \leq 2$);--.

In Column 6 at Line 21 (approx.), Change "$0 \leq \alpha \leq 2$);" to --$0 < \alpha \leq 2$);--.

In Column 10 at Lines 17-18 (approx.), Change "methylpropinonate, ethylpropinonate," to --methylpropionate, ethyl propionate,--.

In Column 12 at Line 19 (approx.), Change "$Li[Ni_{0.5}CO_{0.2}Mn_{0.3}]O_2$" to --$Li[Ni_{0.5}Co_{0.2}Mn_{0.3}]O_2$--.

Signed and Sealed this
Twenty-eighth Day of February, 2017

Michelle K. Lee
*Director of the United States Patent and Trademark Office*

CERTIFICATE OF CORRECTION (continued)
U.S. Pat. No. 9,455,441 B2

In Column 13 at Line 19 (approx.), Change "Li[Ni$_{0.5}$CO$_{0.2}$Mn$_{0.3}$]O$_2$" to --Li[Ni$_{0.5}$Co$_{0.2}$Mn$_{0.3}$]O$_2$--.

In Column 13 at Line 22 (approx.), Change "Li[Ni$_{0.5}$CO$_{0.2}$Mn$_{0.3}$]O$_2$" to --Li[Ni$_{0.5}$Co$_{0.2}$Mn$_{0.3}$]O$_2$--.